United States Patent [19]

Nakagawa

[11] 4,020,481
[45] Apr. 26, 1977

[54] FLUID LEVEL ALARM DEVICE
[75] Inventor: Tadao Nakagawa, Ueda, Japan
[73] Assignee: Nisshin Kogyo Kabushiki Kaisha, Ueda, Japan
[22] Filed: Jan. 14, 1976
[21] Appl. No.: 649,156
[30] Foreign Application Priority Data
  Feb. 25, 1975  Japan ............... 50-26096[U]
[52] U.S. Cl. .................. 340/244 E; 200/84 C; 340/244 A
[51] Int. Cl.² ........................... G08B 21/00
[58] Field of Search ......... 340/244 A, 244 E, 52 C, 340/59; 200/84 C
[56] References Cited
UNITED STATES PATENTS
3,603,926  9/1971  Kimura ................. 340/244 A
3,654,956  4/1972  Tsubouchi ............. 340/244 E
3,826,139  7/1974  Bachman ............... 200/84 C X Primary Examiner—John W. Caldwell
Assistant Examiner—Daniel Myer

[57] ABSTRACT

A fluid level alarm device which is capable of warning a person of a shortage in level of an operating fluid stored in a fluid tank and in which the critical fluid level at which an alarm signal is produced is determined with a maximized accuracy by positioning a magnetically operable reed switch, electrically connected to an alarm, within the tank at a predetermined vertical location in a manner so that, when the fluid stored in the tank is lowered below a specified level, said reed switch is magnetically closed to operate the alarm.

1 Claim, 2 Drawing Figures

U.S. Patent    April 26, 1977    4,020,481
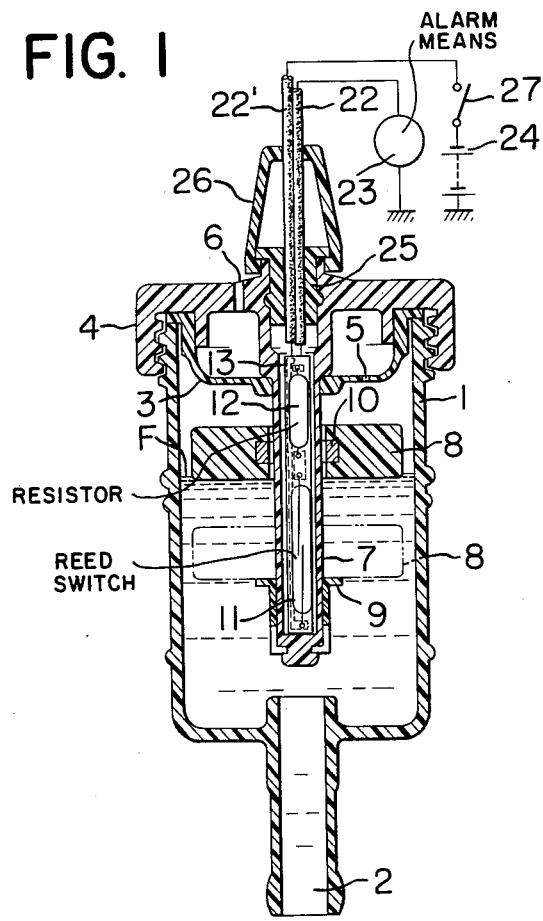
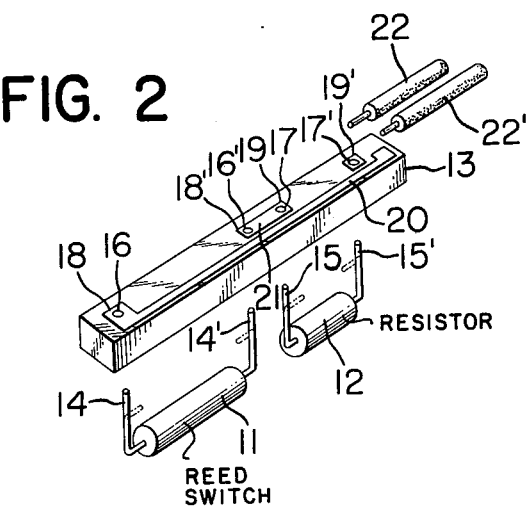

FLUID LEVEL ALARM DEVICE

BACKGROUND AND SUMMARY OF THE INVENTION

This invention relates to a fluid level alarm device for use with automotive vehicles and more specifically to such an alarm device of the kind which is capable of informing the operator of a vehicle of a reduction below a certain level of an operating fluid stored in a fluid tank associated with a master cylinder to serve the purpose of preventing any resulting failure in operation of the master cylinder.

In the past, fluid level alarm devices of the kind described have been known which generally include a float member arranged afloat over the operating fluid or hydraulic oil stored in a fluid tank and provided with a permanent magnet, and a switch cylinder arranged in the tank and mounting therein a magnetically operable reed switch at a prescribed definite position in a manner so that as the fluid in the tank is reduced below a certain level, the float member moves downwardly and the magnet attached thereto comes into the proximity of the reed switch to magnetically close it, thereby operating an appropriate alarm means electrically associated therewith to produce an alarm signal. In such conventional devices, however, it is very difficult to set the reed switch within the tank at a predetermined definite position and hence there are great differences in the critical fluid levels among the devices at which an alarm signal is produced mainly because the positioning of the reed switch within the tank is usually affected by the length of the lead lines connected thereto and therefore errors are unavoidably introduced in the fabrication of the devices.

Therefore, the present invention is intended to provide a novel and improved fluid level alarm device of the kind described which can eliminate the afore-mentioned deficiency involved in similar prior art similar devices.

The above and other objects, advantages and features of the present invention will be apparent from the following description, when taken in conjunction with the accompanying drawing which illustrates one preferred embodiment of the invention.

BRIEF DESCRIPTION OF THE DRAWING

FIG. 1 is a side view, in vertical section, of a preferred fluid level alarm device embodying the present invention and;

FIG. 2 is a perspective view of a switch base plate and its associated parts constituting the essential parts of the device, showing them in a disassembled state.

DESCRIPTION OF THE PREFERRED EMBODIMENT

Referring to the drawing, reference numeral 1 represents a fluid tank adapted to store an operating fluid such as hydraulic oil and having an outlet port formed at the bottom thereof, the outlet port being in communication with a fluid chamber of a conventional type of brake master cylinder (not shown) for an automotive vehicle. The fluid tank 1 has its open top end threadedly fitted with a cap member 4 having a packing or wave shield plate 3 interposed therebetween. The wave shield plate 3 and the cap member 4 are provided with respective vent holes 5, 6 in offset retation with each other.

Integrally connected with the cap member 4 at the central portion of the under side thereof is a switch cylinder 7 which extends therefrom downwardly through the wave shield plate 3 into the operating fluid F in the tank 1.

A float member 8 is fitted over the outer periphery of the switch cylinder 7 for vertical sliding movement therealong in a floating state on the surface of the operating fluid F, the float member having an annular permanent magnet 10 embedded therein on the radially inner side thereof. A stopper element 9 is fixedly mounted on the lower end of the switch cylinder 7 so as to define the lower limit of the downward movement of the float member 8.

Disposed within the switch cylinder 7 is a switch base plate 13 on which are mounted a magnetically responsive type of reed switch 11 and a resistor 12 in a manner as will be detailed later. It is to be noted that the positioning of the switch base plate 13 within the switch cylinder 7 is effected by abutting engagement of the lower end thereof with the bottom inner surface of the switch cylinder.

The switch base plate 13 is formed of phenol resin or other similar non-conductive materials and have two pairs of lower and upper through holes 16, 16' and 17, 17' formed therethrough at respective definite positions, as clearly shown in FIG. 2. On one side of the switch base plate 13, there are printed corresponding two pairs of lower and upper connector terminals 18, 18' and 19, 19' respectively in surrounding relation with the respective through holes 16, 16', 17 and 17', a first current path 20 extending from the lowermost connector terminal 18 to a point near the uppermost connector terminal 19' and a second current path 21 connecting the intermediate connector terminals 18', 19.

The reed switch 11 has a pair of end terminals 14, 14' extended therefrom, which are first passed through the through holes 18, 18' formed in the switch base plate 13 in a direction from the front to the back side thereof, then bent inwardly toward each other at the back side as indicated by the broken lines in FIG. 2 and soldered to the lower connector terminals 18, 18'. Thus, the reed switch is firmly secured to the switch base plate 13 at a fixed location. Also, the resistor 12 has a pair of end terminals 15, 15' soldered to the upper connector terminals 19, 19' in a manner similar to the reed switch 11. A pair of lead lines 22, 22' are soldered at one end to the uppermost connector terminal 19' and the upper end of the first current path 20, respectively. In this manner, the reed switch 11 is positioned in the fluid tank 1 so that it is magnetically closed by the permanent magnet 10 attached to the float member 8 when the float member 8 is moved downwardly under gravity along the switch cylinder 7 into abutting engagement with the stopper element 9.

Sealingly fitted in the switch cylinder 7 at the open top end thereof is a grommet 25 through which the lead lines 22, 22' extend in air-tight retation therewith, one of the lead lines, 22, being soldered at the other end to the positive pole of a battery 24 by way of an alarm means 23 such as an alarm lamp, which may be installed on the instrument panel of an automobile, while the other lead line 22' is connected at the other end to the battery 24 by way of a main switch 27. A dust shield boot 26 is provided to enclose the upper end of the grommet 25, serving the purpose of sealing the interior of the switch cylinder 7 from the atmosphere.

Description is now made of the operation of the embodiment described above.

When the fluid tank 1 is filled with an operating fluid or hydraulic oil F above a predetermined definte level, the float member 8 floating over the fluid surface assumes an upper position remote from the reed switch 11, wherein the reed switch is free from the influence of the magnetic force exerted by the permanent magent 10 embedded in the float member and thus held in its open condition. Consequently, in this state, even if the main switch 27 is closed to operate the associated automotive vehicle, the alarm means 23 will remain inoperative.

On the other hand, however, in cases where the fluid level in the fluid thank 1 is reduced below the predetermined definite level due to fluid leakages or some other failures at the output side of the associated master cylinder, float member 8 lowers along the switch cylinder 7 to abut against the stopper element 9 so that the reed switch 11 is brought into the proximity of the magnet 10 to be magnetically closed under the action of the magnet 10 to operate the alarm means 23 for warning purposes. In this manner, the operator of the vehicle is informed of such unusual shortage of the fluid in the fluid tank 1 and such warning continues until the tank is replenished to raise the float member 8 above a certain level.

In brief, according to the present invention, the first and second current paths 20, 21, electrically connected to the alarm means 23, are printed on the switch base plate 13 on one side thereof, which is arranged inside the hollow switch cylinder 7, and the reed switch 11 is firmly secured to the switch base plate 13 with its end terminals 14, 14' fixedly soldered to the connector terminals 18, 18' respectively formed on the first and second current paths 20, 21. With this arrangement, it is possible to set the reed switch 11 in the fluid tank 1 at a predetermined fixed position relative to the connector terminals 18, 18' printed on the switch base plate 13 with a maximum of accuracy, while introducing little or no practical errors in the manufacture of the device. For this reason, any perilous shortage of the operating fluid stored in the fluid tank 1 can be detected correctly so that the operator of a vehicle equipped with the present inventive device can be warned of such fluid reduction without fail, thereby preventing any possible resulting failure in operation of the master cylinder of the vehicle associated with the tank.

Although one preferred embodiment of the invention has been shown and described, it will be apparent to those skilled in the art that many changes and modifications may be made without departing from the spirit of the invention or from the scope of the appended claim.

What is claimed is:

1. A fluid level alarm device comprising a fluid tank adapted to be connected with a master cylinder, said fluid tank having an open top portion, a cap member detachably secured to said open top porticn, a hollow switch cylinder integrally formed with said cap member and extending therefrom in a generally vertical direction, a float member arranged to float on an operating fluid stored in said fluid tank and fitted over said switch cylinder for vertical sliding movement relative thereto, a magnet carried by said float member, a switch base plate mounted within said switch cylinder and having a lower end abutting against the interior surface of the bottom of said switch cylinder, said plate having a pair of current paths printed on one side thereof and a respective connector terminal formed on each of said current paths in a respective predetermined fixed position, a reed switch having a pair of end terminals respectively and firmly secured to one of said connector terminals of said current paths and operable to be closed under the influence of the magnetic force exerted by said magnet when said float member falls below a certain predetermined level, a source of electrical energy, an alarm means electrically connected to said source of electrical energy, a first lead line connected at one end to one of said current paths and at the other end to said alarm means, and a second lead line connected at one end to the other of said current paths and at the other end of said source of electrical energy, both of said lead lines extending from said respective current paths through, and fixedly supported by, said cap member.

* * * * *